Dec. 23, 1969 W. TRYLINSKI ET AL 3,485,446

PERFORATED TAPE PERFORATOR

Filed July 19, 1966 3 Sheets-Sheet 1

PERFORATED TAPE PERFORATOR

Filed July 19, 1966 3 Sheets-Sheet 3

3,485,446
PERFORATED TAPE PERFORATOR

Wladyslaw Trylinski and Stanislaw Burzynski, Warsaw, and Jerzy Pawlowski, Ursus, and Ryszard Rawski, Warsaw, Poland, assignors to Politechnika Warszawska, Warsaw, Poland Filed July 19, 1966, Ser. No. 566,336
Claims priority, application Poland, July 19, 1965, P 110,103, P 110,104; Jan. 28, 1966, P 112,669
Int. Cl. G06k *1/10;* B26f *1/04*
U.S. Cl. 234—128 2 Claims

ABSTRACT OF THE DISCLOSURE

A tape perforator having means to continuously regulate the spaces between the drive holes and means for pressing the perforated tape against a sprocket drive. The sprocket drum, ratchet wheel, locator, presser and arm and pawl form a unit which is adjustably positioned with respect to tape piercing punches. The pressing means includes a spring biased pressing arm with a roller pressing the tape against the sprocket drum. The piercing punches are preferably controlled by electromagnets.

The invention relates to a perforated tape perforator.

Hitherto known perforated tape perforators have many of the faults described below.

In hitherto known perforated tape perforators, in which the perforated tape is shifted by means of a sprocket drum provided with pins coming into drive holes of the perforated tape, the distance between holes of the perforated tape is adjusted by means of changing the initial position of drive pins in relation to perforating punch. This regulation consists in revolving the sprocket drum through an angle by a suitable displacement of the element fixing the initial position of the drum. This involves the necessity of regulating the remaining structural elements which cooperate with the sprocket drum, such as the pawl, the pawl stop, guide or other structural parts requiring an exact regulation. An improper setting of one of the parts such as the pawl stop may cause destruction of the device. Regulation of such a kind cannot be carried out while the perforate is working. To obtain the required distance between drive holes several repeated settings of the sprocket drum are necessary, and thus carrying out of several additional operations.

In order to secure an orderly cooperation of the tape with pins of the sprocket drum over the total wrapping angle, in known designs the tape is pressed down to the cylindrical surface of the sprocket drum by means of a shaped element, called a further blankholder, which is pressed against the surface of the drum by means of a spring.

In hitherto known designs of a perforator, smooth surfaces of the blankholder and of the sprocket drum, cooperating with the perforated tape, results in such insignificant differences of friction forces between the tape and the surface of the sprocket drum and between the tape and the blankholder, that practically the resistances to motion of the perforated tape are negotiated only by forces occuring between pins and edges of the drive holes of the tape. Owing to a limited strength of the tape perforation this kind of driving may be applied only in cases of insignificant resistances to motion of the perforated tape. If the above described drive system of the perforated tape is applied, so in order to obtain a correct operation of the mechanism, additional shaped arrangements should be applied, which diminish the resistance to motion, e.g. by means of an additional motor.

Punching holes in the perforated tape consists of setting in motion piercing punches, according to signals transmitted to the perforator from a cooperating device. Part of a device controlling the motion of a piercing punch is played commonly by an electromagnet through an element, called an in-shifter, which couples the piercing punch with the driving device of punches.

In many of the known designs it is a necessity to apply electromagnets of large dimensions in relation to the distance between adjacent piercing punches, in order to obtain a condition of suitable arrangement of the electromagnets.

Meeting this condition frequently causes a significant enlargement of the dimensions of the device, a necessity applying in-shifters of complicated and not uniform shape, and renders more difficult the access to separate mechanisms and also leads to an increase of the inertia of elements driven by the electromagnets.

The means for accomplishing the foregoing objects and other advantages, which will be apparent to those skilled in the art, are set forth in the following specification and claims, and are illustrated in the accompanying drawings dealing with a basic embodiment of the present invention. Reference is made now to the drawings in which:

Figure 1:
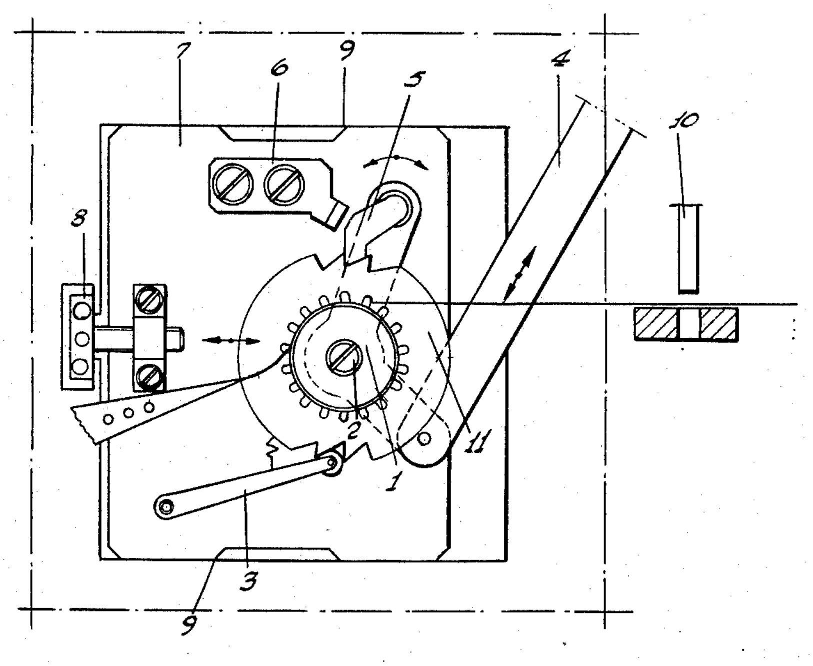
FIG. 1 is a plan view of the inventive system for the continuous regulation of the distance between the drive holes of the perforator.

The system of the continuous regulation of the distance between drive holes is designed as follows in FIG. 1:

The pawl 5 is driven by means of a lever 4. The sprocket drum 1 is connected with its ratchet-wheel 11 mounted on the axle 2. The axle 2, locator 3, pawl 5, stop 6 and the elements controlling the motion of the pawl, are arranged on a base 7, which by means of a screw 8 can be shifted in guide 9 in relation to the axis of piercing punches 10. Change of the distance of the axis of sprocket drum 1 from the axis of piercing punches 10 causes a change of the distance of holes punched in the perforated tape. This is possible due to the fact that the perforated tape 19 and the edges of openings in its guide track engaging with the pins 13 are liable to an elastic strain effect. Because of this, the system of this invention enables an exact and rapid obtaining of desired distance of drive holes punched in the perforated tape, whereby the regulation may be carried out during the operation of the perforator. The regulation is very simple and during carrying-out of its no danger exists of damaging the perforator.

Figure 2A:
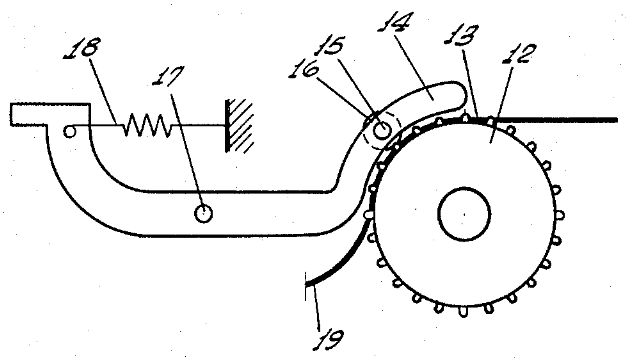
FIGS. 2A and 2B are a side view and plan view, respectively, of the means for pressing down the perforated tape.
Figure 2B:
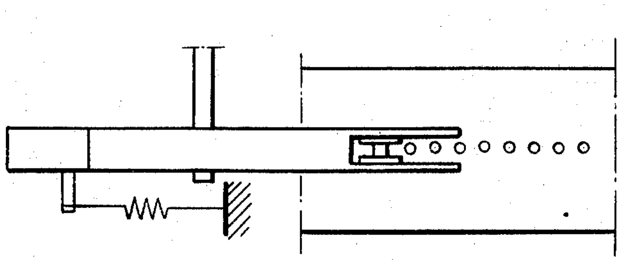

The system of pressing down the perforated tape according to the invention is designed as follows in FIG. 2:

A roll 16 is rotatably mounted on the axle 15, fitted on the blankholder 14. The blankholder 14 is mounted rotatably on the axle 17 of the blankholder. The roll 16 presses, by means of the spring 18, the tape 19 against the surface of the sprocket drum 1. The slot between the shaped surface of the blankholder 14 and the cylindrical surface of the sprocket drum is so small that the pins of the sprocket drum 1 enter into the drive holes of the perforated tape 19 over the whole wrapping angle of the sprocket drum 1 by the perforated tape 19.

In the tape pressing system according to the invention, sliding of the tape over the surface of the sprocket drum is prevented not only by the action of pins on the edges of drive holes of the perforated tape, but also by a significant difference of rolling friction forces between the perforated tape and the roll, and of sliding friction forces between the perforated tape and the surface of the sprocket drum in the place where the tape is pressed down by the roll. The resulting pulling force is additionally increased by a friction force of the perforated tape against the surface of the sprocket drum over the wrapping angle corresponding to pressing points of the roll against the sprocket drum and the entry of the perforated tape on the sprocket drum. In order to enlarge the difference of friction forces more significantly, a knurling is applied to the surface of the sprocket drum cooperating with the perforated tape. The friction index may be also increased by applying a friction material or applying a coarse surface to the sprocket drum.

The system of pressing the perforated tape according to the invention renders is possible to obtain a large pulling force of the shifted tape, without a danger of damaging the drive holes, in addition the system may be especially suitable in quick-running tape perforators.

Figure 3A:
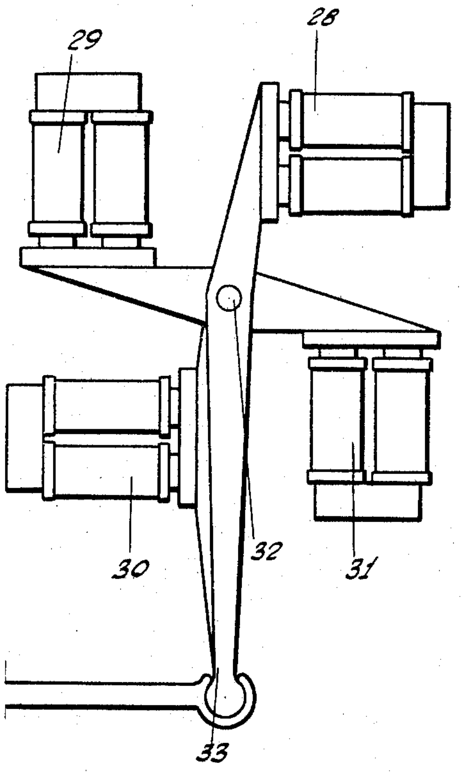
FIGS. 3A and 3B are side and end views, respectively, of a system of electromagnets controlling the punching process of a five to eight track tape.
Figure 3B:
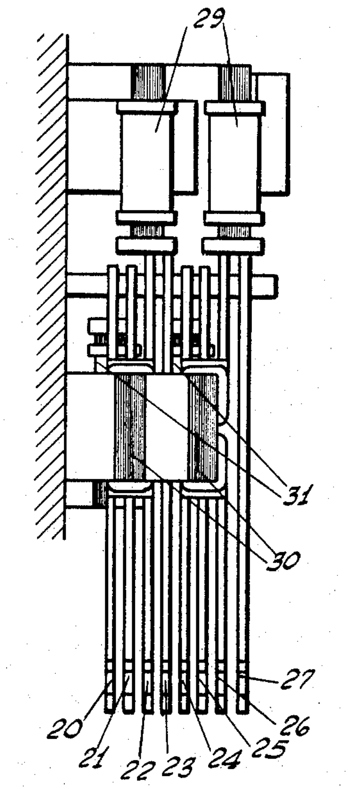

A system of electromagnets controlling the punching process of holes is designed as follows in FIG. 3:

Every one set of electromagnets 28, 29, 30, 31, arranged around the axle 32 is composed of two electromagnets arranged in such manner, that the electromagnets of the set 28 cooperate with in-shifters 23 and 27, electromagnets of the set 29—with in-shifters 22 and 26, electromagnets of the set 30—with in-shifters 21 and 25, and the electromagnets of the set 31—with in-shifters 20 and 24. Under the influence of a control signal the electromagnets effect the rotation of levers 33 on the axle 32, and thus an actuation of in-shifters and then of corresponding piercing punches.

In the system of electromagnets controlling the punching process according to this invention, the distance between adjacent in-shifters or electromagnets can be equal to distances between adjacent piercing punches. Due to this fact the electromagnetic system has small dimensions, the movements of all the elements driven by the electromagnets occur in a single plane, and significantly diminishes the resistances to motion and elastic deformations of the elements.

The system of electromagnets according to the invention renders it possible to apply electromagnets of large dimensions to enable one to achieve high speed and notable reliability of the operation of the mechanism.

What we claim is:

1. A tape perforator for continuously varying the space between perforations comprising (a) an integral driving unit having a sprocket drum, a ratchet wheel driving said drum, an arm and pawl to rotate said wheel and a presser to hold said tape against said drum;

(b) a separately located punching unit comprising at least one piercing punch adapted to be actuated by an electromagnet;

(c) means to vary the distance between said driving unit and said punching unit so that space between adjacent perforations may be varied.

2. A tape perforator having a system of pressing down the perforated tape against the sprocket drum, comprising at least one rotatable mounted roll in an arched presser and a resilient element pressing the tape with the aid of a roll against the sprocket drum, a slot between the presser and the tape, the roll being placed at the presser edge from which the tape comes out from below the presser, thereby causing the perforated tape to wrap around the sprocket drum and to be pressed to the latter over a wrapping angle corresponding to pressing points of the roll against the sprocket drum and the entry of the perforated tape on the sprocket drum, said tape being simultaneously out of contact with the shaped surface of the presser.

References Cited

UNITED STATES PATENTS

| | | | |
|---|---|---|---|
| 2,213,223 | 9/1940 | Krum et al. | 234—128 X |
| 2,964,108 | 12/1960 | Snyder et al. | 234—119 X |
| 2,998,913 | 9/1961 | Alonas | 234—115 |
| 3,019,966 | 2/1962 | Scribner | 234—128 X |
| 3,024,971 | 3/1962 | Kettnich | 234—128 X |
| 3,035,762 | 5/1962 | Drillick | 234—115 |
| 3,119,556 | 1/1964 | Wagemann | 234—128 X |
| 3,274,338 | 9/1966 | Clark et al. | 234—114 X |

FOREIGN PATENTS

| | | |
|---|---|---|
| 887,120 | 1/1962 | Great Britain. |
| 958,273 | 5/1964 | Great Britain. |

WILLIAM S. LAWSON, Primary Examiner

U.S. Cl. X.R.

234—115